United States Patent [19]
Wistuba et al.

[11] 3,872,134
[45] Mar. 18, 1975

[54] PRODUCTION OF ANTHRAQUINONE

[75] Inventors: Hermann Wistuba; Michael Jolyon Sprague, both of Mannheim; Heinz Engelbach, Limburgerhof; Herbert Armbrust; Hans-Juergen Sturm, both of Gruenstadt, all of Germany

[73] Assignee: Badische Anilin- & Soda-Fabrik Aktiengesellschaft, Ludwigshafen/Rhine, Germany

[22] Filed: July 11, 1972

[21] Appl. No.: 270,673

[30] Foreign Application Priority Data
July 15, 1971 Germany................ 2135421

[52] U.S. Cl. .............................................. 260/369
[51] Int. Cl. ............................................... C09b 1/00
[58] Field of Search ............ 260/369; 252/464, 461

[56] References Cited
UNITED STATES PATENTS
3,346,659  10/1967  Barclay .............................. 252/461
3,699,134  10/1972  Armbrust ........................... 260/369

Primary Examiner—Lorraine A. Weinberger
Assistant Examiner—E. Jane Skelly
Attorney, Agent, or Firm—Johnston, Keil, Thompson & Shurtleff

[57] ABSTRACT

Production of anthraquinone by catalytic oxidation of indans with oxygen in the presence of a vanadium (V) compound with one or more than one compound of thallium and antimony. Anthraquinone which can be prepared by the process according to this invention is a valuable starting material for the production of dyes and pesticides.

8 Claims, No Drawings

PRODUCTION OF ANTHRAQUINONE

This invention relates to a new method of making anthraquinone in a simple manner and in good yields and high purity.

It is known from Belgian Pat. No. 752,049 that anthraquinone can be prepared by oxidation of an indan with oxygen in the gas phase in the presence of a pentavalent vanadium compound.

U.S. Pat. Application Ser. No. 146,447 filed May 24, 1971 discloses a process for the production of anthraquinone by oxidation of an aromatic compound with oxygen in the gas phase in the presence of a catalyst at elevated temperature, according to which an indan of the general formula (I):

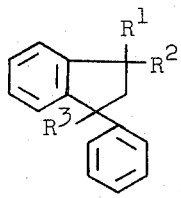

in which $R^1$, $R^2$, $R^3$ are identical or different and each is alkyl, and/or $R^3$ may also each be a hydrogen atom, is oxidized in the presence of a pentavalent vanadium compound and also of a compound of potassium, boron, thallium and/or antimony as catalysts.

We have now found that the process of the U.S. Pat. Application Ser. No. 146,447 filed May 24, 1971 may be modified by carrying out the reaction in the presence of a pentavalent vanadium compound and also of a compound of thallium and antimony with an atomic ratio of from 30,000 to 10 of vanadium to 1 of thallium and of from 8000 to 3 of vanadium to 1 of antimony.

As compared with the process described in the said Belgian patent, the process of the invention surprisingly gives in a simple way a better yield of anthraquinone in higher purity. The selectivity and life of the catalysts according to this invention are also higher.

The indans used as starting material (I) may be prepared by dimerization of substituted or unsubstituted styrenes, for example by the method described in Rabjohn, "Organic Syntheses," Collective Volume IV (John Wiley Inc., New York, 1963), pages 665 et seq. are identical or different and each denotes alkyl having one to four carbon atoms, and $R^1$ and/or $R^3$ may also either or both denote hydrogen. Examples of suitable indans (I) are: 1-methyl-3-phenylindan, 1,3-dimethyl-3-phenylindan, 1,1,3-trimethyl-3-phenylindan, 1-propyl-3-phenylindan and 1-isobutyl-3-phenylindan.

The oxidation is carried out with oxygen or conveniently with a gas mixture containing oxygen, for example air. Any mixtures of oxygen and gases which are inert under the reaction conditions such as argon, steam, nitrogen and/or carbon dioxide of flue gas may also be used. The oxidation is carried out as a rule with an excess of oxygen. A ratio of 25 to 400 moles of oxygen per mole of indan (I) beyond the stoichiometric amount is preferred. In the case of 1-methyl-3-phenylindan the loading may amount to from 5 to 100, advantageously from 10 to 60, particularly from 25 to 50, grams of 1-methyl-3-phenylindan per cubic meter (STP) of air. It is convenient to use from 20 to 2,000, advantageously from 40 to 500, grams of starting material (I) per liter of catalyst (or catalyst on carrier) per hour and one or more than one thallium compound and one or more than one antimony compound may be present in the catalyst in addition to one or more than one pentavalent vanadium compound. The oxidation is preferably carried out in the presence of vanadium pentoxide and/or a vanadate. The vanadium (V) compound may if desired be present during the reaction in admixture with the corresponding vanadium (IV) compound. The same amounts of starting material I, based on catalyst or catalyst and carrier, are usually employed in batch methods of operation. The vanadium (V) catalysts may be monovanadates or polyvanadates, particularly orthovanadates, pyrovanadates or metavanadates. Independently of the composition of the compound and the valency of the corresponding metal in the compound, the atomic ratio of vanadium to the additional elements antimony and thallium present in the catalyst is from 30,000 to 10, preferably from 6,000 to 25, of vanadium to 1 of thallium and at the same time from 8,000 to 3, preferably from 1600 to 8, of vanadium to 1 of antimony.

The compounds of the additional elements may be chosen at will, the oxides, acids, bases, salts, for example carbonates, bicarbonates, chlorides or nitrates and those compounds of the additional elements which are converted into the oxides during the production of the catalysts or during the reaction are generally suitable.

The following are examples of suitable additional compounds: antimony trichloride, thallium nitrate, antimony trioxide, antimony tetraoxide, antimony pentoxide, thallium acetate, thallium carbonate, antimony trioxide hydrate and antimony pentoxide hydrate.

The catalysts are advantageously used together with a carrier material, for example pumice, titanium dioxide, steatite, silicon carbide, iron oxide, silicon oxide, aluminum oxide, and aluminum silicate such as mullite. The catalytically active components may be applied to an inert carrier by a conventional method (Houben-Weyl, "Methoden der organischen Chemie", volume 4/2, pages 143 to 240), for example by impregnation, spraying or precipitation, followed by calcination of the supported catalyst thus produced. The shape and size of the catalysts may vary within a wide range; it is advantageous to use globular, tabletted or particulate catalyst or extrudates having an average diameter of from 2 to 10 millimeters. Vanadate catalyst may be prepared advantageously by precipitation of a solution of ammonium vanadate with an appropriate metal salt, filtration and drying of the metal vanadate precipitate. By adding carrier material prior to or during the precipitation, the metal vanadate is at the same time finely dispersed on the carrier. The solution or suspension of the vanadate may also be applied to the carrier by spraying or soaking. It is also possible to mix the dry or moist vanadate with the carrier, if necessary to break up the mixture and then to prepare appropriate shapes, for example by means of an extruder. After the catalyst has been dried, it is advantageously calcined, for example at a temperature of from 300° to 700°C.

For the preparation of the vanadium pentoxide catalysts, for example vanadium pentoxide may be dissolved in an aqueous oxalic acid or hydrochloric acid and the solution applied to a suitable carrier, for example titanium dioxide, the carrier dried and if necessary calcined. Solutions of ammonium vanadate in water may be used in an analogous manner. It is also possible to apply vanadium pentoxide together with titanium dioxide as a very thin layer, for example of less than 0.1 mm, to a spherical carrier and to prepare the catalyst in the manner described in Belgian Pat. No. 681,237.

The production of catalysts containing vanadium, thallium, antimony and advantageously tellurium on spherical carriers by a flame spraying or plasma spraying method, for example the method described in U.S. Pat. Application Ser. No. 142,770 filed May 12, 1971 has proved to be advantageous. The said additional compounds may be mechanically mixed with the vanadium pentoxide to be applied by means of flame spraying or with a compound which is converted into vanadium pentoxide upon heating, as for example vanadic acid. It may be advantageous however first to prepare a homogeneous solution which contains the elements to be applied. The compounds to be applied may be recovered from this solution for example by evaporation. It may also be favorable to melt together the compounds to be applied and to comminute the cooled melt. This method is particularly suitable for the preparation of homogeneous active materials containing minor amounts of the additional components. It is preferred to chose as additional compounds those have a melting point of below 1,200°C in order to make possible adequate adhesion to the carrier, particularly in cases in which the additional elements are present in the catalyst in large amounts. A plasma burner may be used if necessary in the case of high melting point compounds. In this case it is advantageous to avoid partial or complete reduction of pentavalent vanadium to tetravalent vanadium in order to prevent the formation of the higher melting point tetravalent vanadium.

The oxidation is advantageously carried out at a temperature of from 250° to 500°C, particularly from 300° to 450°C. This temperature is measured as a rule as the temperature of the cooling medium, for example a saltpeter bath (tube wall temperature). A bleed stream of the offgas from the reaction having a lower oxygen content may be saturated with the vapor of the starting material in order to adjust the desired concentration of indan (I) in the reaction mixture.

The starting material (I) may for example be oxidized in the following way: the starting indan is vaporized and mixed with a stream of air which has been heated to more than 150°C. The mixture of gas and vapor is then passed through a bed of catalyst in a reactor at the reaction temperature. It is advantageous to use as the reactor a brine-cooled tubular reactor, a fluidized bed reactor with inbuilt cooling units, or a layered reactor with intermediate cooling. The end product is separated in the usual way from the reactor mixture, for example the gas leaving the reactor is passed through one or more separators in order to separate the anthraquinone from the bulk of the byproducts. Purification of the end product is possible if required, for example by dissolving it in alkaline sodium dithionite solution and filtration of the unreacted starting material. The end product is then precipitated from the filtrate by air oxidation and separated. Similarly the reaction mixture may be passed into water or dilute caustic soda solution and the end product isolated by sublimation from the solid residue thus formed.

In a preferred embodiment of the process of the invention, the catalyst or advantageously the catalyst applied to a carrier in any way, preferably by the above-mentioned flame spraying or plasma spraying methods, is heated to a temperature of 450° to 650°C, preferably of 500° to 600°C, and kept at this temperature for some time (calcination). The calcination period is advantageously from one hour to twenty-four hours, particularly from five to sixteen hours. Calcination is preferably carried out in the presence of a gas containing oxygen, for example air or flue gas, and at a pressure of from 1 to 3 atmospheres. Reference is made to Ullmanns Encyklopadie der technischen Chemie, volum 9, pages 254 et seq., for further details of the production of the catalyst.

In other respects the process is carried out under the conditions of the process of U.S. Pat. Application Ser. No. 146,447 filed May 24, 1971, particularly as regards reaction control and the production and composition of the catalyst.

Anthraquinone which can be prepared by the process according to this invention is a valuable starting material for the production of dyes and pesticides. Reference is made to the abovementioned publications and Ullmans Encyklopadie der technischen Chemie, volume 3, pages 659 et seq. as regards uses of anthraquinone.

The invention is illustrated by Examples. The parts set out in the Examples are parts by weight. They bear the same relation to parts by volume as the kilogram to the liter.

The starting material 1-methyl-3-phenylindan is used in all the Examples in the form of a 92% by weight 1-methyl-3-phenylindan and is given in parts of starting material calculated as 100%.

EXAMPLE 1

A mixture of 31.7 parts of vanadium pentoxide (particle size more than 100 microns), 0.27 parts of powdered antimony (particle size less than 250 microns) and 0.65 part of thallium nitrate (particles size less than 250 microns) is sprayed by a flame spraying unit onto 339.7 parts of mullite spheres (5 to 7 mm diameter).

77.5 parts of the catalyst thus prepared is charged into a tubular reactor (21 mm internal diameter). A mixture of 100,000 parts by volume of air and 3.79 parts of 1-methyl-3-phenylindan is passed through the catalyst per hour. The temperature of the wall of the tube is 405°C, the temperature in the interior of the catalyst bed is 432°C. The gaseous reaction mixture leaving the reactor is cooled to 50°C so that the end product and the unreacted 1-methyl-3-phenylindan are condensed. The uncondensed portion is washed with water. After evaporation of the wash water, the remaining residue is combined with the condensate.

The following results are obtained:

| | |
|---|---|
| Starting material 1-methyl-3-phenylindan: | 18.93 parts |
| Amount of offgas | 500,000 parts by volume |
| CO and CO$_2$ in offgas | 1.75 % by volume |
| crude end product | 19.75 parts |

The following are determined in the end product by ultraviolet absorption:

| | |
|---|---|
| 71.0% by weight of anthraquinone = | 14.02 parts |
| 10.6% by weight of phthalic anhydride = | 2.09 parts |
| 0.24% by weight of unreacted starting compound (I) = | 0.05 parts |

(equivalent to a conversion of 99.7% of theory and a yield of anthraquinone, based on reacted starting material, of 74.3% of theory).

EXAMPLE 2

A mixture of 28.8 parts of vanadium pentoxide (particle size more than 100 microns), 1.32 parts of powdered antimony (particle size less than 250 microns) and 1.58 parts of thallium nitrate (particle size less than 250 microns) is sprayed by a flame spraying unit onto 339.7 parts of mullite spheres (5 to 7 mm diameter).

77.0 parts of the catalyst thus prepared is charged into a tubular reactor (21 mm internal diameter). A mixture of 100,000 parts by volume of air and 3.77 parts of 1-methyl-3-phenylindan is passed through the catalyst per hour. The temperature of the wall of the tube is 415°C, the temperature in the interior of the catalyst bed is 437°C. The gaseous reaction mixture leaving the reactor is cooled to 50°C so that the end product and the unreacted 1-methyl-3-phenylindan are condensed. The uncondensed portion is washed with water. After evaporation of the wash water, the remaining residue is combined with the condensate.

The following results are obtained:

| | |
|---|---|
| Starting material 1-methyl-3-phenylidan: | 18.84 parts |
| Amount of offgas | 500,000 parts by volume |
| CO and $CO_2$ in offgas | 1.47% by volume |
| crude end product | 19.7 parts |

The following are determined in the end product by ultraviolet absorption:

| | |
|---|---|
| 72.1% by weight of anthraquinone = | 14.20 parts |
| 9.6% by weight of phthalic anhydride = | 1.89 parts |
| 0.26% by weight of unreacted starting compound (I) = | 0.05 parts |

(equivalent to a conversion of 99.7% of theory and a yield of anthraquinone, based on reacted starting material, of 75.6% of theory).

EXAMPLE 3

A mixture of 38.4 parts of vanadium pentoxide, 1.6 parts of antimony trioxide and 0.04 part of thallium nitrate are melted together at 700°C and the solidified material is comminuted to a particle size of less than 250 microns. 15.2 parts of this comminuted mixture is mixed with 15.2 parts of vanadium pentoxide (particle size more than 100 microns) and the powder thus obtained is sprayed by means of a flame spraying unit onto 339.1 parts of mullite spheres (diameter 5 to 7 mm).

77.8 parts of the catalyst thus prepared is charged into a tubular reactor (21 mm internal diameter). A mixture of 100,000 parts by volume of air and 3.79 parts of 1-methyl-3-phenylindan is passed through the catalyst per hour. The temperature of the wall of the tube is 410°C, the temperature in the interior of the catalyst bed is 441°C. The gaseous reaction mixture leaving the reactor is cooled to 50°C so that the end product and the unreacted 1-methyl-3-phenylindan are condensed. The uncondensed portion is washed with water. After evaporation of the washing water, the remaining residue is combined with the condensate.

The following results are obtained:

| | |
|---|---|
| Starting material 1-methyl-3-phenylindan: | 18.93 parts |
| Amount of offgas | 500,000 parts by volume |
| CO and $CO_2$ in offgas | 1.75% by volume |
| crude end product | 19.77 parts |

The following are determined in the end product by ultraviolet absorption:

| | |
|---|---|
| 68.4% by weight of anthraquinone = | 13.37 parts |
| 13.3% by weight of phthalic anhydride = | 2.60 parts |
| 0.16% by weight of unreacted starting compound (I) = | 0.03 parts |

(equivalent to a conversion of 99.8% of theory and a yield of anthraquinone, based on reacted starting material, of 70.7% of theory).

EXAMPLE 4

A mixture of 38.3 parts of vanadium pentoxide, 1.6 parts of antimony trioxide and 0.08 part of thallium nitrate are melted together at 700°C and the solidified material is comminuted to a particle size of less than 250 microns. 14.9 parts of this comminuted mixture is mixed with 14.9 parts of vanadium pentoxide (particle size more than 100 microns) and the powder thus obtained is sprayed by means of a flame spraying unit onto 337.9 parts of mullite spheres (diameter 5 to 7 mm).

77.8 parts of the catalyst thus prepared is charged into a tubular reactor (21 mm internal diameter). A mixture of 100,000 parts by volume of air and 3.77 parts of 1-methyl-3-phenylindan is passed through the catalyst per hour. The temperature of the wall of the tube is 405°C, the temperature in the interior of the catalyst bed is 430°C. The gaseous reaction mixtures leaving the reactor is cooled to 50°C so that the end product and the unreacted 1-methyl-3-phenylindan are condensed. The uncondensed portion is washed with water. After evaporation of the wash water, the remaining residue is combined with the condensate.

The following results are obtained:

| | |
|---|---|
| Starting material 1-methyl-3-phenylindan: | 18.84 parts |
| Amount of offgas | 500,000 parts by volume |
| CO and $CO_2$ in offgas | 1.59% by volume |
| crude end product | 19.1 parts |

The following are determined in the end product by ultraviolet absorption:

| | |
|---|---|
| 70.4% by weight of anthraquinone = | 13.45 parts |
| 12.0% by weight of phthalic anhydride = | 2.29 parts |
| 0.08% by weight of unreacted starting compound (I)= | 0.02 parts |

(equivalent to a conversion of 99.9% of theory and a yield of antraquinone (based on reacted starting material, of 71.1% of theory).

EXAMPLE 5

A mixture of 38.2 parts of vanadium pentoxide, 1.6 parts of antimony trioxide and 0.16 part of thallium nitrate are melted together at 700°C and the solidified material is comminuted to a particle size of less than 250 microns. 15.4 parts of this comminuted to a particle size of less than 250 microns. 15.4 parts of this comminuted mixture is mixed with 15.4 parts of vanadium pentoxide (particle size more than 100 microns) and the powder thus obtained is sprayed by means of a flame spraying unit onto 338.7 parts of mullite spheres (diameter 5 to 7 mm).

78.0 parts of the catalyst thus prepared is charged into a tubular reactor (21 mm internal diameter). A mixture of 100,000 parts by volume of air and 3.79 parts of 1-methyl-3-phenylindan is passed through the catalyst per hour. The temperature of the wall of the tube is 410°C, the temperature in the interior of the catalyst bed is 441°C. The gaseous reaction mixture leaving the reactor is cooled to 50°C so that the end product and the unreacted 1-methyl-3-phenylindan are condensed. The uncondensed portion is washed with water. After evaporation of the wash water, the remaining residue is combined with the condensate.

The following results are obtained:

| | |
|---|---|
| Starting material 1-methyl-3-phenylindan: | 18.93 parts |
| Amount of offgas | 500,000 parts by volume |
| CO and $CO_2$ in offgas | 1.68% by volume |
| crude end product | 19.3 parts |

The following are determined in the end product by ultraviolet absorption:

| | |
|---|---|
| 71.3% by weight of anthraquinone = | 13.766 parts |
| 11.9% by weight of phthalic anhydride = | 2.30 parts |
| 0.12% by weight of unreacted starting compound (I) = | 0.02 parts |

(equivalent to a conversion of 99.9% of theory and a yield of anthraquinone (based on reacted starting material, of 72.7% of theory).

EXAMPLE 6

A mixture of 100 parts of vanadium pentoxide, 2 parts of antimony trioxide and 0.65 part of thallium are fused together at 700°C and the solidified material is comminuted to a particle size of 200 to 500 microns. 10.9 parts of this comminuted mixture is sprayed by means of a flame spraying unit onto 166.4 parts of mullite spheres (5 to 7 mm in diameter).

74 parts of the catalyst thus prepared is charged into a tubular reactor (21 mm internal diameter). A mixture of 100,000 parts by volume of air and 4.29 parts of 1-methyl-3-phenylindan is passed through the catalyst per hour. The temperature of the wall of the tube is 420°C, the temperature in the interior of the catalyst bed is 444°C. The gaseous reaction mixture leaving the reactor is cooled to 50°C so that the end product and the unreacted 1-methyl-3-phenylindan are condensed. The uncondensed portion is washed with water. After evaporation of the wash water, the remaining residue is combined with the condensate.

The following results are obtained:

| | |
|---|---|
| Starting material 1-methyl-3-phenylindan: | 12.88 parts |
| Amount of offgas | 300,000 parts by volume |
| CO and $CO_2$ in offgas | 1.6% by volume |
| crude end product | 12.29 parts |

The following are determined in the end product by ultraviolet absorption:

| | |
|---|---|
| 74.4% by weight of anthraquinone = | 9.14 parts |
| 14.3% by weight of phthalic anhydride = | 1.76 parts |
| 0.34% by weight of unreacted starting compound (I) = | 0.04 parts |

(equivalent to a conversion of 99.7% of theory and a yield of anthraquinone, based on reacted starting material, of 71.2% of theory).

EXAMPLE 7

A mixture of 493.2 parts of vanadium pentoxide, 16.8 parts of antimony powder and 10.0 parts of thallium nitrate are melted together at 700°C and the solidified material is comminuted to a particle size of less than 250 microns. 107.6 parts of this comminuted mixture with 99.4 parts of vanadium pentoxide (particle size more than 100 microns) and the powder thus obtained is sprayed by means of a flame spraying unit onto 2,832 parts of steatite spheres (term: Fl/Sp) diameter 6 to 7 mm.

69.2 parts of the catalyst thus prepared is charged into a tubular reactor (21 mm internal diameter). A mixture of 100,000 parts by volume of air and 3.73 parts of 1-methyl-3-phenylindan is passed through the catalyst per hour. The temperature of the wall of the tube is 415°C, the temperature in the interior of the catalyst bed is 442°C. The gaseous reaction mixture leaving the reactor is cooled to 50°C so that the end product and the unreacted 1-methyl-3-phenylindan are condensed. The uncondensed portion is washed with water. After evaporation of the wash water, the remaining residue is combined with the condensate.

The following results are obtained:

| | |
|---|---|
| Starting material 1-methyl-3-phenylindan: | 18.65 parts |
| Amount of offgas | 500,000 parts by volume |
| CO and $CO_2$ in offgas | 1.72% by volume |
| crude end product | 19.4 parts |

The following are determined in the end product by ultraviolet absorption:

| | |
|---|---|
| 70.4% by weight of anthraquinone = | 13.65 parts |
| 8.4% by weight of phthalic anhydride = | 1.63 parts |
| 0.44% by weight of unreacted starting compound (I)= | 0.09 parts |

(equivalent to a conversion of 99.5% of theory and a yield of anthraquinone, based on reacted starting material, of 73.5% of theory).

EXAMPLE 8

A mixture of 493.2 parts of vanadium pentoxide, 16.8 parts of antimony powder and 10.0 parts of thallium nitrate are melted together at 700°C and the solidified material is comminuted to a particle size of less than 250 microns. 111.8 parts of this comminuted mixture is mixed with 103.2 parts of vanadium pentoxide (particle size more than 100 microns) and the powder thus obtained is sprayed by means of a flame spraying unit onto 3,632 parts of mullite spheres (diameter 5 to 7 mm).

326.9 parts of the catalyst thus prepared is charged into a tubular reactor (21 mm internal diameter). A mixture of 100,000 parts by volume of air and 68.1 parts of 1-methyl-3-phenylindan is passed through the catalyst per hour. The temperature of the wall of the tube is 442°C, the temperature in the interior of the catalyst bed is 530°C. The gaseous reaction mixture leaving the reactor is cooled to 50°C so that the end product and the unreacted 1-methyl-3-phenylindan are condensed. The uncondensed portion is washed with water. After evaportion of the wash water, the remaining residue is combined with the condensate.

The following results are obtained:

| | |
|---|---|
| Starting material 1-methyl-3-phenylindan: | 272.7 parts |
| Amount of offgas | 8,000,000 parts by volume |
| CO and $CO_2$ in offgas | 1.4% by volume |
| crude end product | 279.2 parts |

The following are determined in the end product by ultraviolet absorption:

| | |
|---|---|
| 69.6% by weight of anthraquinone = | 194.4 parts |
| 10.7% by weight of phthalic anhydride = | 29.9 parts |
| 0.11% by weight of unreacted starting compound (I) = | 0.3 parts |

(equivalent to a conversion of 99.9% of theory and a yield of anthraquinone, based on reactaed starting material, of 71.3% of theory).

EXAMPLE 9

A mixture of 29.2 parts of vanadium pentoxide (particle size more than 100 microns), 0.51 parts of powdered antimony (particle size less than 250 microns) and 0.61 part of thallium nitrate (particle size less than 250 microns) is sprayed by a flame spraying unit onto 339.7 parts of mullite spheres (5 to 7 mm diameter).

81.2 parts of the catalyst thus prepared is charged into a tubular reactor (21 mm internal diameter). a mixture of 100,000 parts by volume of air and 3.81 of 1-methyl-3-phenylindan is passed through the catalyst per hour. The temperature of the wall of the tube is 415°C, the temperature in the interior of the catalyst bed is 445°C. The gaseous reaction mixture leaving the reactor is cooled to 50°C so that the end product and the unreacted 1-methyl-3-phenylindan are condensed. The uncondensed portion is washed with water. After evaporation of the wash water, the remaining residue is combined with the condensate.

The following results are obtained:

| | |
|---|---|
| Starting material 1-methyl-3-phenylindan: | 15.22 parts |
| Amount of offgas | 400,000 parts by volume |
| CO and $CO_2$ in offgas | 1.78% by volume |
| crude end product | 16.15 parts |

The following are determined in the end product by ultraviolet absorption:

| | |
|---|---|
| 72.6% by weight of anthraquinone = | 11.72 parts |
| 10.2% by weight of phthalic anhydride = | 1.65 parts |
| 0.10% by weight of unreacted starting compound (I) = | 0.02 parts |

(equivalent to a conversion of 99.9% of theory and a yield of anthraquinone (based on reacted starting material, of 77.1% of theory).

EXAMPLE 10

A mixture of 27.8 parts of vanadium pentoxide (particle size more than 100 microns), 0.51 parts of powdered antimony (particle size less than 250 microns) and 1.49 parts of thallium nitrate (particle size less than 250 microns) is sprayed by a flame spraying unit onto 183.5 parts of silicon carbide spheres (diameter from 4.5 to 6 mm).

46.7 parts of the catalyst thus prepared is charged into a tubular reactor (21 mm internal diameter). A mixture of 100,000 parts by volume of air and 3.76 parts of 1-methyl-3-phenylindan is passed through the catalyst per hour. The temperature of the wall of the tube is 410°C, the temperature in the interior of the catalyst bed is 431°C. The gaseous reaction mixture leaving the reactor is cooled to 50°C so that the end product and the unreacted 1-methyl-3-phenylidane are condensed. The uncondensed portion is washed with water. After evaportion of the wash water, the remaining residue is combined with the condensate.

The following results are obtained:

| | |
|---|---|
| Starting material 1-methyl-3-phenylindan: | 18.78 parts |
| Amount of offgas | 500,000 parts by volume |
| CO and $CO_2$ in offgas | 1.35% by volume |
| crude end product | 18.80 parts |

The following are determined in the end product by ultraviolet absorption:

| | |
|---|---|
| 74.3% by weight of anthraquinone = | 13.97 parts |
| 11.0% by weight of phthalic anahydride = | 2.07 parts |
| 0.26% by weight of unreacted starting compound (I) = | 0.05 parts |

(equivalent to a conversion of 99.9% of theory and a yield of anthraquinone, based on reacted starting material, of 74.5% of theory).

EXAMPLE 11

A mixture of 38.0 parts of vanadium pentoxide, 2.0 parts of antimony trioxide and 10.0 parts of thallium nitrate are melted together at 700°C and the solidified material is comminuted to a particle size of less than 250 microns. 14.9 parts of this comminuted mixture is mixed with 15.3 parts of vanadium pentoxide (particle size more than 100 microns) and the powder thus obtained is sprayed by means of a flame spraying unit onto 341.3 parts of mullite spheres (diameter 5 to 7 mm).

69.9 parts of the catalyst thus prepared is charged into a tubular reactor (21 mm internal diameter). A mixture of 100,000 parts by volume of air and 3.73 parts of 1-methyl-3-phenylindan is passed through the catalyst per hour. The temperature of the wall of the tube is 410°C, the temperature in the interior of the catalyst bed is 442°C. The gaseous reaction mixture leaving the reactor is cooled to 50°C so that the end product and the unreacted 1-methyl-3-phenylindane are condensed. The uncondensed portion is washed with water. After evaporation of the wash water, the remaining residue is combined with the condensate.

The following results are obtained:

| | |
|---|---|
| Starting material 1-methyl-3-phenylindan: | 22.39 parts |
| Amount of offgas | 600,000 parts by volume |
| CO and CO$_2$ in offgas | 1.58% by volume |
| crude end product | 23.0 parts |

The following are determined in the end product by ultraviolet absorption:

| | |
|---|---|
| 69.8% by weight of anthraquinone = | 16.05 parts |
| 8.2% by weight of phthalic anhydride = | 1.89 parts |
| 0.16% by weight of unreacted starting compound (I) = | 0.04 parts |

(equivalent to a conversion of 99.8% of theory and a yield of anthraquinone (based on reacted starting material, of 71.8% of theory).

EXAMPLE 12

A mixture of 100 parts of vanadium pentoxide, 0.1 part of antimony trioxide and 1.3 parts of thallium are fused together at 700°C and the solidified material is comminuted to a particle size of 200 to 500 microns. 11.0 parts of this comminuted mixture is sprayed by means of a flame spraying unit onto 166.1 parts of mullite spheres (5 to 7 mm in diameter).

76 parts of the catalyst thus prepared is charged into a tubular reactor (21 mm internal diameter). A mixture of 150,000 parts by volume of air and 6.26 parts of 1-methyl-3-phenylindan is passed through the catalyst per hour. The temperature of the wall of the tube is 410°C, the temperature in the interior of the catalyst bed is 451°C. The gaseous reaction mixture leaving the reactor is cooled to 50°C so that the end product and the unreacted 1-methyl-3-phenylindan are condensed. The uncondensed portion is washed with water. After evaporation of the wash water, the remaining residue is combined with the condensate.

The following results are obtained:

| | |
|---|---|
| Starting material 1-methyl-3-phenylindan: | 14.10 parts |
| Amount of offgas | 337,500 parts by volume |
| CO and CO$_2$ in offgas | 1.90% by volume |
| crude end product | 13.54 parts |

The following are determined in the end product by ultraviolet absorption:

| | |
|---|---|
| 70.5% by weight of anthraquinone = | 9.54 parts |
| 15.4% by weight of phthalic anhydride = | 2.09 parts |
| 0.98% by weight of unreacted starting compound (I) = | 0.13 parts |

(equivalent to a conversion of 99.0% of theory and a yield of anthraquinone, based on reacted starting material, of 68.3% of theory).

EXAMPLE 13

A mixture of 100 parts of vanadium pentoxide, 0.5 part of antimony trioxide and 1.3 parts of thallium are fused together at 700°C and the solidified material is comminuted to a particle size of 200 to 500 microns. 10.9 parts of this comminuted mixture is sprayed by means of a flame spraying unit onto 166 parts of mullite spheres (5 to 7 mm in diameter).

78 parts of the catalyst thus prepared is charged into a tubular reactor (21 mm internal diameter). A mixture of 100,000 parts by volume of air and 4.21 parts of 1-methyl-3-phenylindan is passed through the catalyst per hour. The temperature of the wall of the tube is 418°C, the temperature in the interior of the catalyst bed is 448°C. The gaseous reaction mixture leaving the reactor is cooled to 50°C so that the end product and the unreacted 1-methyl-3-phenylindan are condensed. The uncondensed portion is washed with water. After evaporation of the wash water, the remaining residue is combined with the condensate.

The following results are obtained:

| | |
|---|---|
| Starting material 1-methyl-3-phenylindan: | 12.63 parts |
| Amount of offgas | 300,000 parts by volume |
| CO and CO$_2$ in offgas | 1.90% by volume |
| crude end product | 11.44 parts |

The following are determined in the end product by ultraviolet absorption:

| | |
|---|---|
| 75.5% by weight of anthraquinone = | 8.64 parts |
| 18.6% by weight of phthalic anhydride = | 2.31 parts |
| 0.15% by weight of unreacted starting compound (I) = | 0.02 parts |

(equivalent to a conversion of 99.9% of theory and a yield of anthraquinone, based on reacted starting material, of 68.5% of theory).

EXAMPLE 14

A mixture of 31.3 parts of vanadium pentoxide (particle size more than 100 microns), 0.27 parts of powdered antimony (particle size less than 250 microns) and 0.32 part of thallium nitrate (particle size less than 250 microns) is sprayed by a flame spraying unit onto 339.7 parts of mullite spheres (5 to 7 mm diameter).

80.8 parts of the catalyst thus prepared is charged into a tubular reactor (21 mm internal diameter). A mixture of 100,000 parts of volume of air and 3.82 parts of 1-methyl-3-phenylindan is passed through the catalyst per hour. The temperature of the wall of the tube is 405°C, the temperature in the interior of the catalyst bed is 438°C. The gaseous reaction mixture leaving the reactor is cooled to 50°C so that the end product and the unreacted 1-methyl-3-phenylindan are condensed. The uncondensed portion is washed with water. After evaporation of the wash water, the remaining residue is combined with the condensate.

The following results are obtained:

| | |
|---|---|
| Starting material 1-methyl-3-phenylindan: | 19.11 parts |
| Amount of offgas | 500,000 parts by volume |
| CO and CO$_2$ in offgas | 1.80% by volume |
| crude end product | 19.9 parts |

The following are determined in the end product by ultraviolet absorption:

| | |
|---|---|
| 71.5% by weight of anthraquinone = | 14.23 parts |
| 11.9% by weight of phthalic anhydride = | 2.37 parts |
| 0.14% by weight of unreacted starting compound (I) = | 0.03 parts |

We claim:

1. In a process for the production of anthraquinone in the gas phase in the presence of a catalyst at an elevated temperature of from 250° to 500°C wherein an indan of the formula (I):

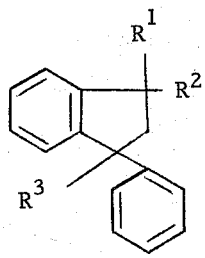

(I)

in which $R^1$, $R^2$ and $R^3$ may be identical or different and each is alkyl of 1 to 4 carbon atoms, and $R^1$ and/or $R^3$ may also each be a hydrogen atom, is oxidized in the presence of a catalyst, the improvement which comprises: using a catalyst consisting essentially of a pentavalent vanadium compound, a compound of thallium and a compound of antimony with an atomic ratio of 30,000 to 10 of vanadium to 1 of thallium and of 8,000 to 3 of vanadium to 1 of antimony.

2. A process as claimed in claim 1 wherein the said atomic ratios are from 6,000 to 25 of vanadium to 1 of thallium and from 1,600 to 8 of vanadium to 1 of antimony.

3. A process as claimed in claim 1 carred out at from 300° to 450°C.

4. A process as claimed in claim 1 wherein the catalyst is calcined at from 450° to 650°C for some time prior to use.

5. A process as claimed in claim 4 wherein the calcination is carried out at from 500° to 600°C.

6. A process as claimed in claim 1 wherein the reaction is carried out with a catalyst containing vanadium, thallium or antimony which has been prepared on spherical carriers by a flame spraying or plasma spraying method.

7. A process as claimed in claim 1 carried out with from 20 to 2,000 grams of starting material (I) per liter of catalyst, or catalyst on carrier, per hour.

8. A process as claimed in claim 1 carried out with a catalyst applied to a carrier by a flame spraying or plasma spraying method and then heated to a temperature of from 450° to 650°C to undergo calcination.

* * * * *